United States Patent [19]

Mitchell, Jr. et al.

[11] Patent Number: 5,747,103
[45] Date of Patent: May 5, 1998

[54] METHOD AND APPARATUS FOR PRINTIGN LITHIUM PATTERNS ON A PRESS

[75] Inventors: Chauncey T. Mitchell, Jr., Lakeland, Tenn.; David M. Good; Mark A. Shadle, both of Peachtree City, Ga.; Gerrit L. Verschuur, Lakeland, Tenn.

[73] Assignee: Voxcom, Inc., Peachtree City, Ga.

[21] Appl. No.: 835,666

[22] Filed: Apr. 10, 1997

[51] Int. Cl.$^6$ .................................................. B05D 5/12
[52] U.S. Cl. .................. 427/123; 29/623.5; 101/121; 427/282; 427/374.4
[58] Field of Search .............. 29/623.1, 623.3, 29/623.5; 427/123, 282, 374.4; 429/192; 101/121

[56] References Cited

U.S. PATENT DOCUMENTS

| | | | |
|---|---|---|---|
| 4,911,995 | 3/1990 | Balanger et al. | 429/192 |
| 4,977,046 | 12/1990 | Bleszinski, Jr. et al. | 429/194 |
| 5,035,965 | 7/1991 | Sangyoji et al. | 429/124 |
| 5,055,968 | 10/1991 | Nishi et al. | 361/395 |
| 5,350,645 | 9/1994 | Lake et al. | 429/124 |
| 5,396,177 | 3/1995 | Kuo et al. | 324/435 |
| 5,516,598 | 5/1996 | Visco et al. | 429/42 |
| 5,523,179 | 6/1996 | Chu | 429/104 |
| 5,532,077 | 7/1996 | Chu | 429/102 |
| 5,540,742 | 7/1996 | Sangyoji et al. | 29/623.5 |
| 5,582,623 | 12/1996 | Chu | 29/623.1 |
| 5,642,562 | 7/1997 | Tattle | 29/623.1 X |

OTHER PUBLICATIONS

"Characterization of Thin-Film Rechargeable Lithium Batteries with Lithium Cobalt Oxide Cathodes" by B. Wang et al., Journal of the Electro-chemical Society, vol. 143, No. 10, Oct. 1996, pp. 3203–3213.

"Oriented LiCoO$_2$ Films and High-Rate Thin-Film Lithium Batteries" by J.B. Bates et al., 2 pages. (OakRidge National Laboratory and Michigan Technological University).

"Thin-Film Rechargeable Lithium Batteries", OakRidge National Laboratory, Oak Ridge, TN., published on Internet, 10 pages.

Primary Examiner—Michael Lusignan
Attorney, Agent, or Firm—Eugene Stephens & Associates

[57] ABSTRACT

A printing station conveys a supply of molten lithium from a heated tank to a nozzle within a protective shroud. A web traverses a chiller also within the shroud. The nozzle dispenses discrete amounts of the molten lithium onto successive portions of the web in contact with the chiller. The chilled lithium solidifies into solid lithium patterns. A sealer also within the shroud prevents exposure of the solid lithium patterns to ambient air. The station can be incorporated into an in-line press for forming a succession of electrochemical cells.

34 Claims, 5 Drawing Sheets

METHOD AND APPARATUS FOR PRINTIGN LITHIUM PATTERNS ON A PRESS

TECHNICAL FIELD

The invention relates to the formation of thin layers of lithium in patterns and to printing such lithium patterns on elongated webs, particularly for the purpose of making a succession of thin electrochemical cells on an in-line press.

BACKGROUND

Lithium performs well as an electrode material in electrochemical cells but, because of its volatility, is difficult and potentially dangerous to handle. In pure form, lithium must be kept in special environments to prevent its interaction with the normal components of air.

As a result of this volatility, thin electrochemical cells, also referred to as "laminar", "flexible", or "flat" cells, which require only thin layers of active materials, are much more difficult to manufacture with lithium electrodes than with other common electrode materials. The heightened performance of lithium sometimes justifies its increased handling costs. However, the increased costs significantly limit applications for the thin cells, which are often intended for powering inexpensive products also having a thin form (e.g., smart cards).

Lithium electrodes have been made from thin foils that are cut into patterns and laminated together with other thin layers to form individual electrochemical cells. These foils are fragile and are costly to make at reduced thicknesses. Generally, the foils are thicker than necessary for fulfilling their electrochemical functions in cells, which is wasteful and potentially more hazardous. Special equipment must be used for handling the lithium, and a special environment must be maintained throughout the manufacturing process until the lithium foil is sealed within individual cells. The special handling requirements for lithium foils and other difficulties associated with its combination with other layers require time-consuming assembly procedures for the individual cells.

U.S. Pat. No. 5,350,645 to Lake et al. discloses an alternative method for making a matrix of polymer-lithium cells in sheet form. Thin sheets of metal foils are used as substrates for supporting lithium anodes, which are applied as patterned solder. The sheets with presumably differentially treated areas are conveyed across a molten bath of lithium within a protected environment. Thin patterns of lithium are deposited on the sheets, and these sheets are laminated together with other sheets containing electrolyte and cathode materials for completing the cells.

Molten lithium requires more rigorous handling precautions than those for handling lithium in a solid state. However, the protective environment surrounding the molten bath is breached by sheets entering and leaving the environment, which increases risk of contamination or degradation of the environment with potentially disastrous consequences.

SUMMARY OF INVENTION

Our invention provides for printing a succession of lithium patterns along a web. The patterns can be shaped to form electrodes of thin electrochemical cells or other devices. In comparison to lithium patterns laid down as individual foils or soldered to metal sheets, manufacturing rates can be increased to printing speeds while lowering material costs and enhancing safety.

For example, we prefer to heat lithium into its molten state within a first confinement such as a tank having a controlled environment (e.g., an argon atmosphere). At the same time, we advance a web through a second confinement such as a shroud that has a less rigorously controlled environment. Successive portions of the web are maneuvered past a chiller within the shroud. The molten lithium is conveyed from the tank to the shroud and is dispensed through an opening onto the successive portions of the web that are maneuvered past the chiller. The dispensed lithium is chilled to a solid state forming the succession of lithium patterns along the web. Before exiting the shroud, a seal is applied over the lithium patterns to limit exposure of the lithium patterns to the environment outside the shroud.

The tank within which the lithium is melted can provide a carefully controlled environment that is not breached by web movements. Within the shroud, the dispensed lithium can be nearly instantaneously converted into a solid form and be quickly sealed. Accordingly, only small individual quantities of lithium require protection within the shroud, each for only a small amount of time.

For forming a succession of electrochemical cells, two webs are preferably advanced along an in-line press. One of the webs is treated as described above for forming a succession of lithium patterns. Similar successions of other electrode patterns and electrolyte patterns are printed on either of the webs. The two webs are sealed together for protecting the lithium patterns and completing a succession of electrochemical cells.

DRAWINGS

FIG. 1 schematically depicts a station for printing and sealing a succession of lithium patterns on a web.

FIG. 2 diagrams a press incorporating a station similar to the station of FIG. 1 for printing a succession of electrochemical cells.

FIG. 3 displays a broken-away cross-sectional view of the succession of electrochemical cells formed between two webs.

FIG. 4 diagrams an alternative press incorporating a station similar to the station of FIG. 1 for printing a succession of electrochemical cells.

FIG. 5 schematically depicts an alternative station for printing and sealing a succession of lithium patterns on a web.

FIG. 6 diagrams a press incorporating a station similar to the station of FIG. 5 for printing a succession of electrochemical cells.

DETAILED DESCRIPTION

Figure 1:
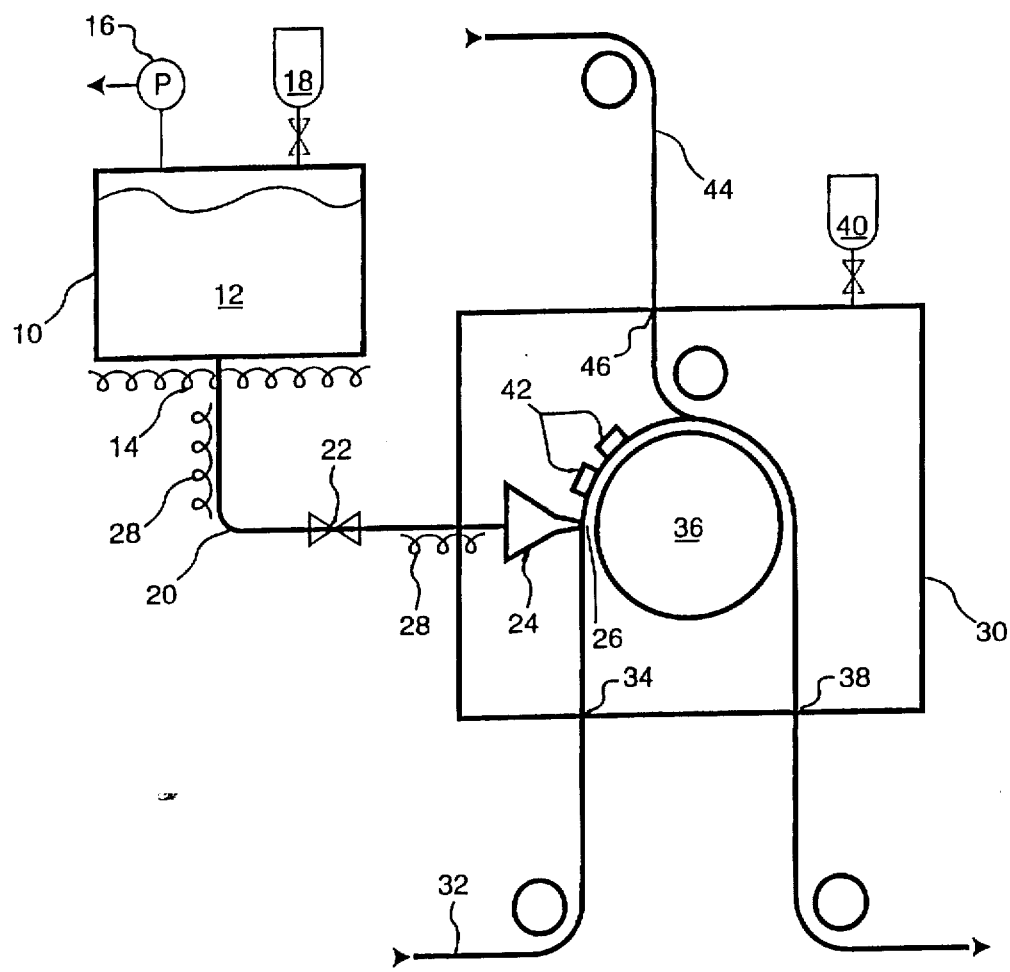

A station for printing and sealing lithium patterns along continuous webs is depicted in FIG. 1. An enclosed tank 10 melts lithium 12 using a heater 14. A pump 16 evacuates air from the tank 10, which is replaced by an inert gas from a gas supply 18 to provide a controlled non-reactive environment for the molten lithium 12 within the tank 10.

A conduit 20 interrupted by a control valve 22 conveys the molten lithium 12 from the tank 10 to a nozzle 24 having a specially shaped opening 26 within a shroud 30. Although shown interrupting the conduit 20, the valve 22 can be incorporated into the nozzle 24 for regulating flows of the molten lithium 12 through the opening 26. All of the components that come into contact with the molten lithium 12 including portions of the tank 10, the conduit 20, the valve 22, and the nozzle 24 are preferably made of stainless steel or other materials that do not react with the molten lithium 12. Heaters 28 positioned along the path between the tank 10 and the opening 26 maintain the lithium 12 in its molten state until it is discharged from the opening 26.

A web 32, which can be a transverse portion of a wider web or an entire web, advances into the shroud 30 through an entrance 34 and maneuvers past a chiller 36, such as a chilled roller, before leaving the shroud 30 through an exit 38. Another supply 40 of inert gas purges the shroud 30 of ambient air and maintains a positive pressure within the shroud 30 to keep the air from returning through the entrance 34 or the exit 38.

The nozzle 24 dispenses small quantities of the molten lithium 12 onto successive portions of the web 32 in contact with the chiller 36. Upon contacting the chiller 36, the dispensed quantities of lithium 12 solidify into a succession of individual patterns 42. The opening 26 of nozzle 24 controls a width of the patterns 42 and the valve 22 controls their length. Alternatively, a patterned screen (not shown) could be used to distribute the flow of molten lithium 12 onto the web 32.

Also within the shroud 30, the lithium patterns 42 are sealed against exposure to moisture by laminating another web 44 over the web 32. Edges of the laminated webs 32 and 34 can be sealed by heat, adhesives, maskings, or other moisture barriers to further protect the lithium patterns 42. The web 44 can be a separate web that enters the shroud through its own entrance 46, or the webs 32 and 44 can be different portions of the same web that is slit, shifted and laminated together or is folded and laminated together within the shroud 30 to seal the lithium patterns 42. A coating, such as a barrier coating, could also be used to seal the lithium patterns 42.

Although the environment within the shroud 30 is not controlled to the same extent as the environment within the tank 10, less protection is required for the limited quantities and duration of molten lithium 12 within the shroud 30. The solid lithium patterns 42 require even less protection. However, the lithium patterns 42 preferably emerge from the shroud 30 permanently sealed against exposure to the ambient environment. The shroud 30 could be replaced or further enhanced by a so-called "gas curtain" that displaces ambient air with a non-reactive gas such as argon in the vicinity of the nozzle 24. A dry air environment, such as a dry room, could be provided to permit additional processing steps before finally sealing the lithium patterns 42.

Figure 3:
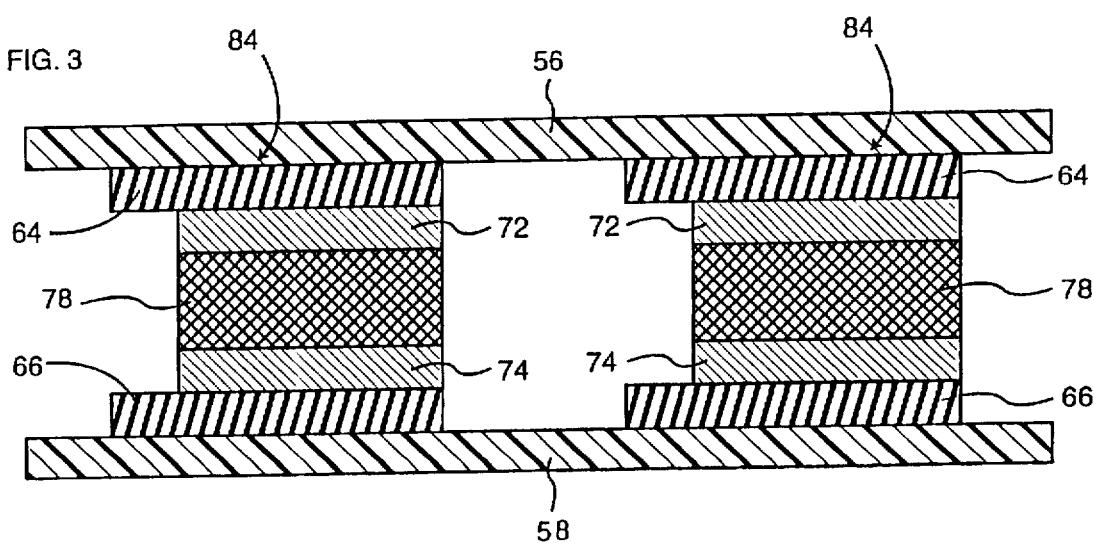
Figure 2:
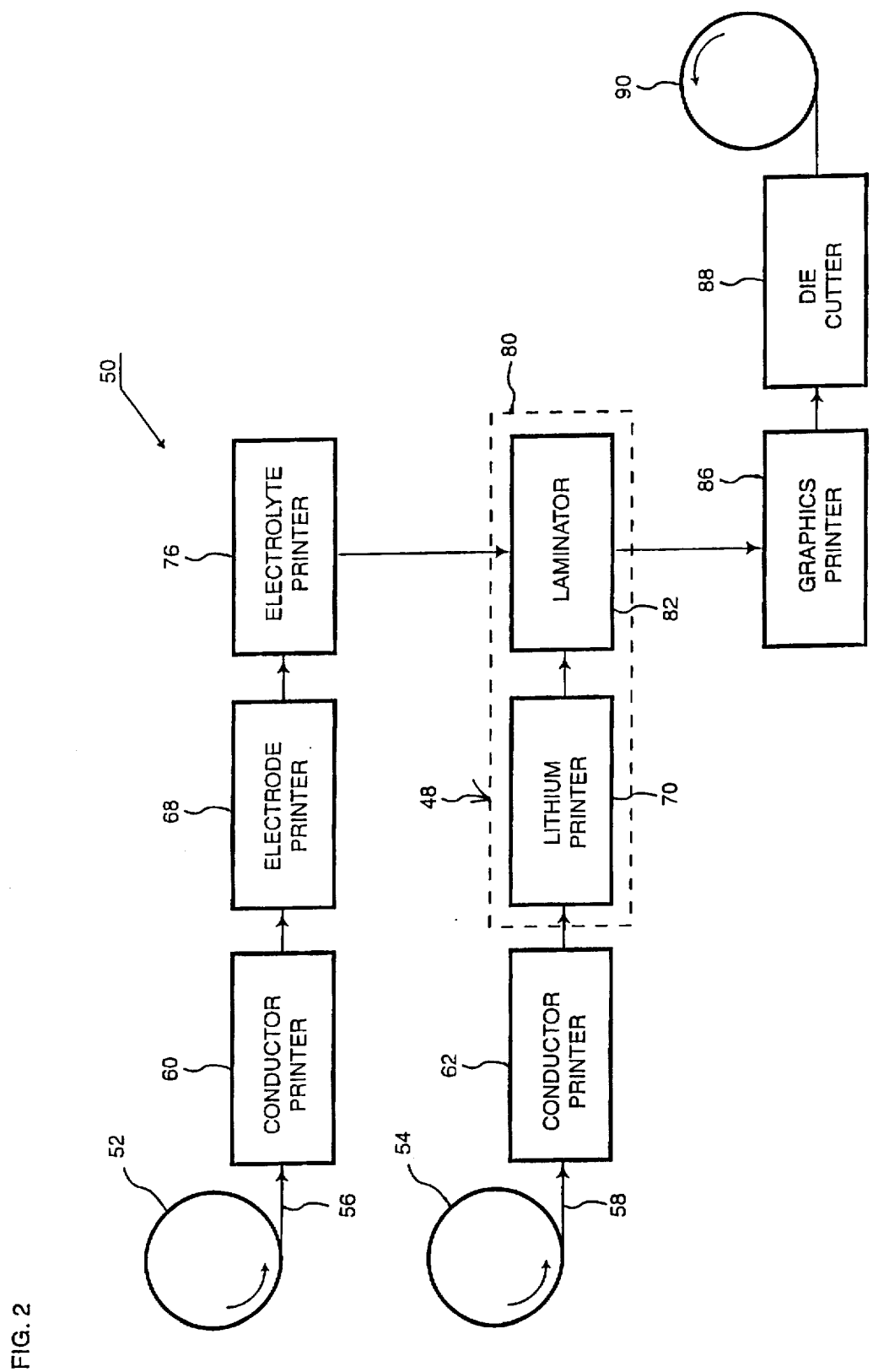

A station 48 similar to the printing and sealing station of FIG. 1 can be incorporated into an in-line press 50 such as depicted in FIG. 2 for making a succession of lithium electrochemical cells such as depicted in FIG. 3. The press 50 includes separate unwinders 52 and 54 supplying continuous length webs 56 and 58, which are preferably made of moisture-resistant film or similarly impervious paper. Alternatively, moisture barriers could be printed on the webs 56 and 58 along the in-line press.

Conductor/collector printers 60 and 62 separately print conductor/collector patterns 64 and 66 on the two webs 56 and 58 using conductive inks, such as carbon-based inks. The printers 60 and 62 preferably employ flexographic printing, but other printing techniques could also be employed including screen printing, stencil printing, transfer printing, gravure printing, or other pattern-coating techniques. In place of printing conductor/collector patterns 64 and 66, either of the two webs 56 and 58 could be made from conductive materials, such as conductive films.

On the web 56, an electrode printer 68 prints an electrode pattern 72 over the conductor/collector pattern 64, and an electrolyte printer 76 prints an electrolyte pattern 78 over the electrode pattern 72. Both printers 68 and 76 can employ any of a variety of printing techniques such as those mentioned for printing the conductor/collector patterns 64 and 66. Electrode materials of a more gelatin composition can be extruded. The electrode and electrolyte materials for forming the electrode and electrolyte patterns 72 and 78 must be compatible with lithium electrodes in electrochemical cells.

On the other web 58, a lithium printer 70 of the printing and sealing station 48 deposits lithium electrode patterns 74 over the conductor/collector layer 66 within a shroud 80 or other protective confinement such as a gas curtain or dry room. While still within the protective shroud 80, the web 58 advances to a laminator 82 where it is joined with the web 56 to seal the lithium patterns 74 between the two webs 56 and 58. The electrolyte patterns 78 of the web 56 contact the lithium electrode patterns 74 of the web 58 to form a succession of electrochemical cells 84.

A graphics printer 86 and a die cutter 88 exemplify subsequent operations that can be performed on the laminated webs 56 and 58 to separate the electrochemical cells 84 from each other or to combine the electrochemical cells 84 with other layers or devices. A rewinder 90 winds the laminated webs 56 and 58 into a roll from which the electrochemical cells 84 can be subsequently dispensed or further processed. Alternatively, the electrochemical cells could be dispensed from the die cutter 88.

Figure 4:
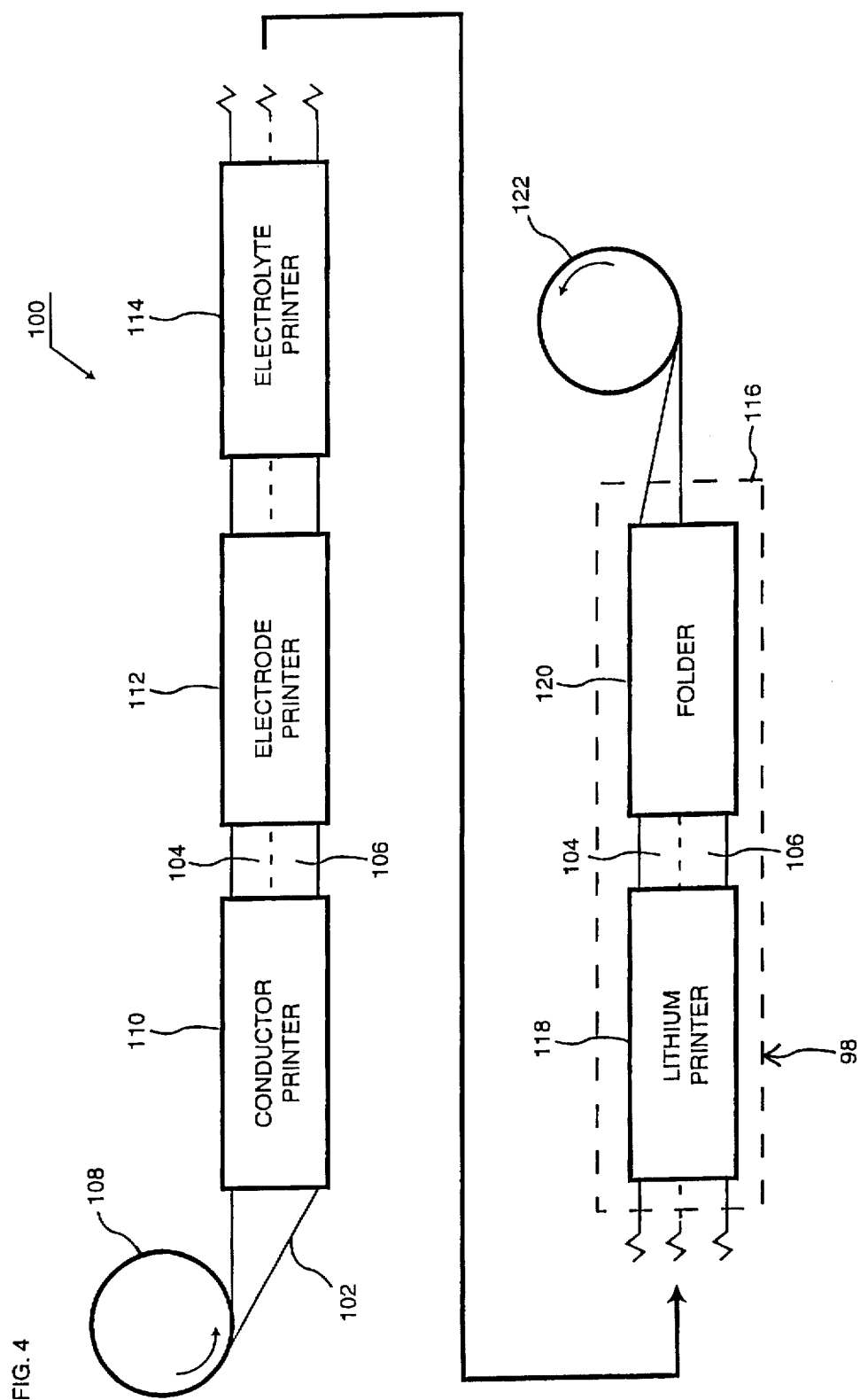

An alternative press 100 for forming similar thin electrochemical cells with lithium electrodes is depicted in FIG. 4. A web 102 made up of two adjacent webs 104 and 106 advances from an unwinder 108 to a conductor/collector printer 110 that lays down conductive/collector patterns on both webs 104 and 106. An electrode printer 112 and an electrolyte printer 114 lay down electrode and electrolyte patterns on the web 104.

Both webs 104 and 106 advance together into a shroud 116 or other confinement for a printing and sealing station 98; and a lithium printer 118, similar to the printer depicted in FIG. 1, lays down lithium electrode patterns on the web 106. While still within the shroud 116 of the station 98, a folder/laminator 120 folds and laminates the two webs 104 and 106 together to form a succession of electrochemical cells similar to those disclosed in FIG. 3. A similar result can be attained by separating and shifting the webs 104 and 106 prior to lamination. A variety of subsequent operations can be performed on the web 102, although only a rewinder 122 is actually shown.

Figure 5:
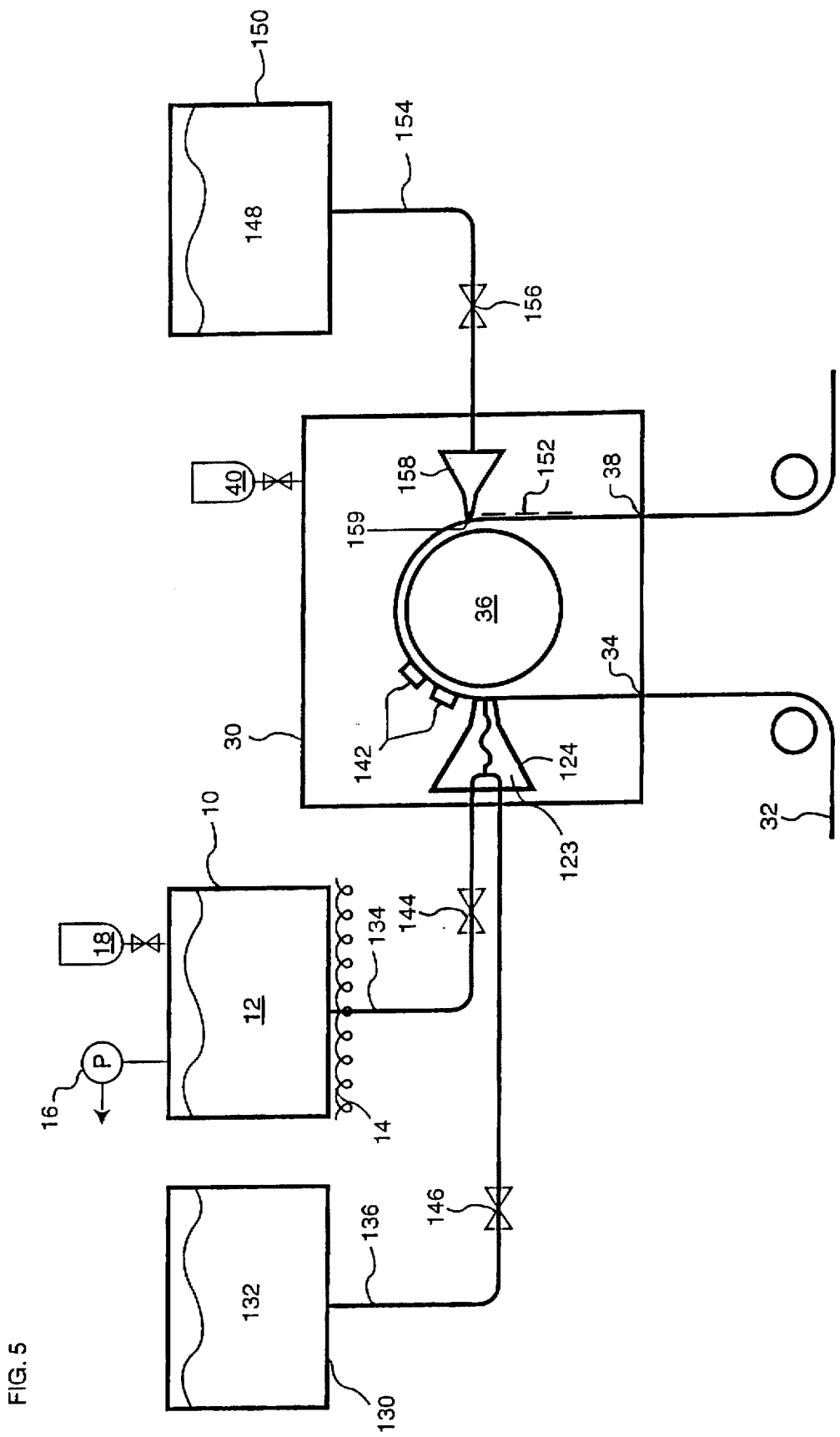

Another station for printing and sealing lithium patterns is depicted in FIG. 5. Components in common with the station of FIG. 1 retain their same reference numerals. Two major differences are evident, either of which could constitute a separate embodiment. One relates to mixing the molten lithium 12 with another agent 132 for forming lithium mixture patterns 142, and another relates to forming electrolyte patterns 152 within the shroud 30 for sealing the lithium mixture patterns 142.

A tank 130 contains the agent 132, which can be carbon or another additive that improves some property of the lithium such as conductivity. Conduits 134 and 136 convey the molten lithium 12 and the agent 132 from the tanks 10 and 130 to a mixing head 123 of a nozzle 124, where the molten lithium 12 and the agent 132 mix together before being dispensed from the nozzle 124 in the form of the lithium mixture patterns 142. Separate valves 144 and 146 meter respective flows from the tanks 10 and 130 to regulate the relative composition of the mixture.

In place of laminating two webs together to form a seal and to bring the electrolyte patterns 152 into contact with the lithium mixture patterns 142, the electrolyte patterns 152 are printed over the lithium mixture patterns 142. Similar to the way in which the molten lithium 12 is dispensed, an electrolyte 148 is drawn from a tank 150, which can be heated, and is conveyed by a conduit 154 through a valve 156 to a nozzle 158. A specially shaped opening 159 in the nozzle 158 together with the valve 156 control the size and shape of the electrode patterns 152. Other forms of printing appropriate for the choice of electrolyte material 148 could also be used for similarly applying the electrolyte patterns 152.

Figure 6:
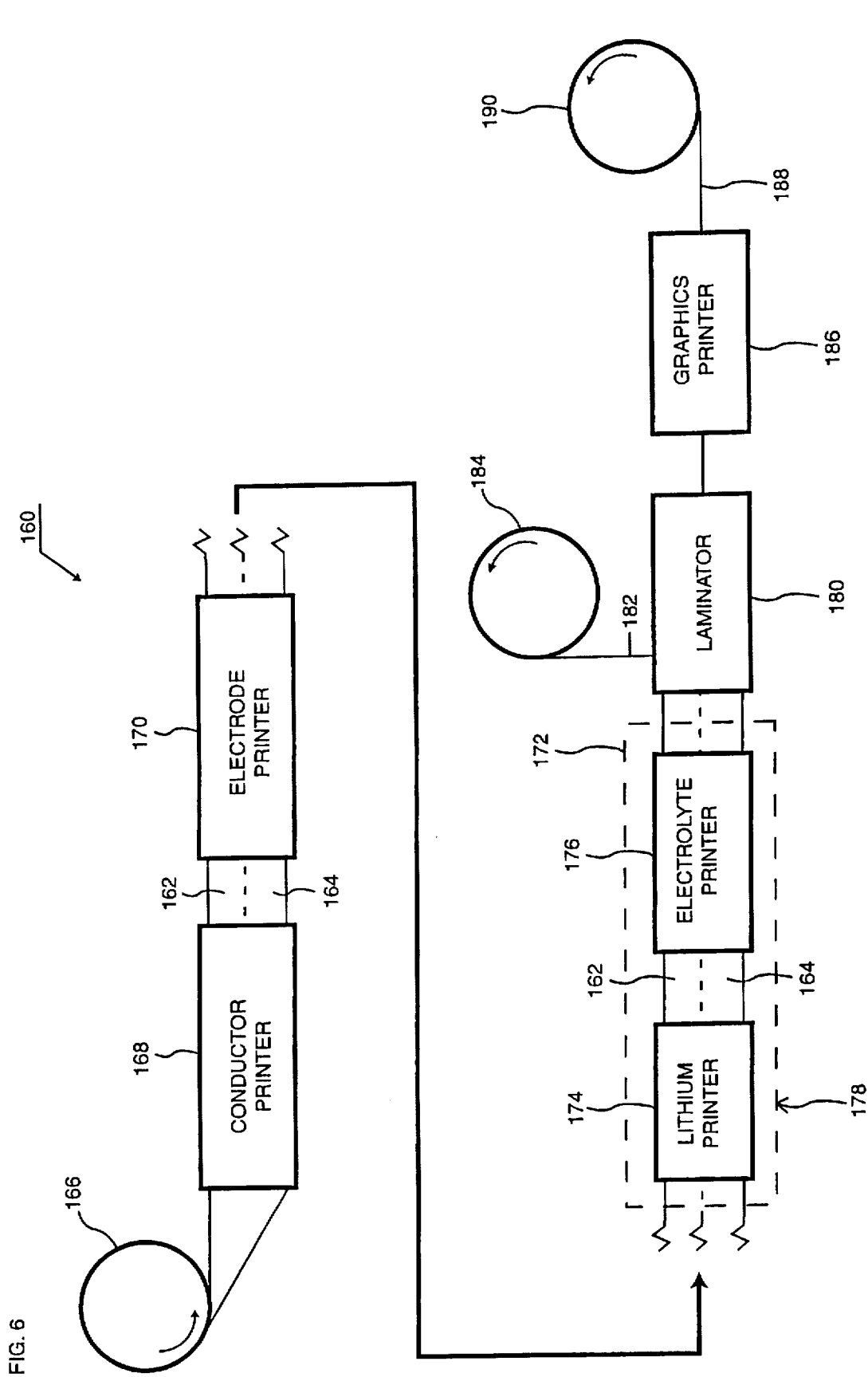

A press 160 incorporating a printing and sealing station 178 similar to the printing and sealing station of FIG. 5 is depicted by FIG. 6. Two adjacent webs 162 and 164, which are preferably lateral portions of the same web, advance from an unwinder 166 to a conductor/collector printer 168 that prints conductor/collector patterns on at least one of the two webs 162 and 164. Electrode printer 170 prints electrode patterns in registration with the conductor/collector patterns on the web 162. Within a shroud 172 or other confinement for the printing and sealing station 178, a lithium printer 174 prints lithium (or lithium mixture patterns) on the web 164, and an electrolyte printer 176 prints electrolyte patterns over the lithium patterns to seal the lithium patterns against exposure to ambient environment.

While in some instances it may be preferable to laminate the two webs 162 and 164 together to form a succession of electrochemical cells, the electrolyte printer 176 can be arranged to print electrolyte patterns over both the lithium patterns and the electrode patterns to form a succession of electrochemical cells having two electrodes sharing a common layer.

Further along the press 160, a laminator 180 laps a separate web 182 from another unwinder 184 together with the webs 162 and 164 to provide a more permanent seal for the lithium patterns and additional structure for supporting subsequent operations. As an example of such subsequent operations, graphic printer 186 is depicted for printing graphical information on the web 182 of a combined web laminate 188 that is subsequently rewound on rewinder 190.

The above examples disclose our preferred embodiments of the invention, along with some sense of the many variations with which the invention can be practiced. Many more embodiments will be apparent to those of skill in the art within the scope and teaching of this invention.

We claim:

1. A method of printing a succession of lithium patterns along a web comprising the steps of:
   heating lithium to its molten state within a first confinement having a controlled environment;
   advancing a web through a second confinement having a controlled environment;
   maneuvering successive portions of the web past a chiller within a portion of the second confinement;
   conveying the molten lithium from the first confinement to an opening within the second confinement;
   dispensing discrete amounts of the molten lithium through the opening onto the successive portions of the web that are maneuvered past the chiller;
   chilling the dispensed lithium to a solid state forming the succession of lithium patterns along the web; and
   applying a seal over the lithium patterns to limit exposure of the lithium patterns to ambient environment.

2. The method of claim 1 in which said step of applying includes applying a seal within the second confinement.

3. The method of claim 2 in which the web is a first of two webs and said step of applying includes a step of laminating a second of the two webs to the first web so that the lithium patterns emerge from the second confinement sealed between the two webs.

4. The method of claim 3 in which the first and second webs are lateral portions of a common web and said step of laminating is preceded by a step of folding the first and second webs together.

5. The method of claim 3 in which the first and second webs are lateral portions of a common web and said step of laminating is preceded by a step of shifting the first and second webs together.

6. The method of claim 3 in which the first and second webs are independent webs that are separately advanced into the second confinement.

7. The method of claim 3 including the further step of applying an electrolyte to the second web prior to laminating the two webs together.

8. The method of claim 2 in which said step of applying a seal includes applying an electrolyte pattern over the lithium patterns within the second confinement.

9. The method of claim 1 in which the opening within the second confinement is formed in a nozzle and said step of dispensing molten lithium includes heating the nozzle and using a valve for controlling a flow of lithium through the nozzle.

10. The method of claim 1 including a further step of mixing the molten lithium with an agent before dispensing discrete amounts of the molten lithium.

11. The method of claim 10 in which the agent is a conductive material.

12. A method of printing a succession of electrochemical cells having lithium electrodes comprising the steps of:
   advancing first and second webs along an in-line press;
   printing a succession of first electrodes on one of the first and second webs;
   heating lithium to its molten state within a first confinement having a controlled environment;
   advancing the first web through a second confinement having a controlled environment;
   maneuvering successive portions of the first web past a chiller within a portion of the second confinement;
   conveying the molten lithium from the first confinement to an opening within the second confinement;
   dispensing discrete amounts of the molten lithium through the opening onto the successive portions of the first web that are maneuvered past the chiller;
   chilling the dispensed lithium to a solid state forming a succession of second electrodes along the first web;
   applying an electrolyte in a succession of patterns along one of the first and second webs; and
   laminating the first and second webs together so that the succession of electrolyte patterns contact the successions of first and second electrodes for forming the succession of electrochemical cells.

13. The method of claim 12 in which said step of laminating includes sealing the succession of second electrodes within the second confinement to limit exposure of the solid state lithium to ambient environment outside the second confinement.

14. The method of claim 13 in which the second confinement is one of a shroud, a gas curtain, and a dry room.

15. The method of claim 13 in which said step of laminating is preceded by a step of folding the first and second webs together.

16. The method of claim 13 in which said step of laminating is preceded by a step of shifting the first and second webs together.

17. The method of claim 12 in which said step of applying electrolyte includes applying electrolyte to the first electrodes prior to laminating the first and second webs.

18. The method of claim 12 including a further step of mixing the molten lithium with an agent before dispensing discrete amounts of the molten lithium.

19. A method of printing a succession of electrochemical cells having lithium electrodes comprising the steps of:

advancing a web along an in-line press;

printing a succession of first electrodes along the web;

heating lithium to its molten state within a first confinement having a controlled environment;

advancing the web through a second confinement having a controlled environment;

maneuvering successive portions of the web past a chiller within a portion of the second confinement;

conveying the molten lithium from the first confinement to an opening within the second confinement;

dispensing discrete amounts of the molten lithium through the opening onto the successive portions of the web that are maneuvered past the chiller;

chilling the dispensed lithium to a solid state forming a succession of second electrodes along the web; and applying an electrolyte in a succession of patterns in contact the successions of first and second electrodes for forming the succession of electrochemical cells.

20. The method of claim 19 in which said step of applying the electrolyte includes applying the electrolyte over the second electrodes for sealing the succession of second electrodes within the second confinement to limit exposure of the solid state lithium to ambient environment outside the second confinement.

21. The method of claim 20 in which the web is a first of two webs and including a further step of laminating a second web to the first web for permanently sealing the succession of second electrodes.

22. The method of claim 19 including a further step of mixing the molten lithium with an agent before dispensing discrete amounts of the molten lithium.

23. A station of an in-line printing press for printing and sealing lithium patterns along a web comprising:

a first confinement having a controlled environment for heating lithium to a molten state;

a second confinement having a controlled environment through which a web is transported;

a chiller that chills successive portions of the transported web within said second confinement;

a conduit that conveys molten lithium from the first confinement to an opening in the second confinement;

a dispenser that dispenses discrete amounts of the molten lithium through the opening onto the chilled portions of the transported web resulting in a hardening of the discrete amounts of the molten lithium into solid lithium patterns; and a sealer that seals the solid lithium patterns from exposure to ambient environment.

24. The station of claim 23 in which said first confinement is a heated tank connected to a supply of inert gas.

25. The station of claim 24 in which said second confinement is a shroud connected to a supply of inert gas.

26. The station of claim 24 in which said conduit is also heated for maintaining the lithium in a molten state while the molten lithium is conveyed between said heated tank and said opening in the second confinement.

27. The station of claim 26 including a valve interrupting flow of the molten lithium through said opening for regulating the discrete amounts of dispensed lithium.

28. The station of claim 27 in which said dispenser includes a heated nozzle for shaping the discrete amounts of dispensed lithium.

29. The station of claim 23 in which said sealer is located within said second confinement.

30. The station of claim 29 in which the web is a first of two webs and said sealer is a laminator that joins the two webs.

31. The station of claim 29 in which said sealer is a printer.

32. The station of claim 24 in which said tank is a first of two tanks and a second of said tanks contains an agent.

33. The station of claim 32 in which said conduit is a first of two conduits and a second of said conduits joins with said first conduit for mixing the agent together with the molten lithium.

34. The station of claim 33 in which said first and second conduits are joined at a mixing head.

* * * * *